(12) United States Patent
Yang et al.

(10) Patent No.: US 11,457,386 B2
(45) Date of Patent: *Sep. 27, 2022

(54) METHOD AND SYSTEM FOR EDGE COMPUTING HANDOVER SERVICE

(71) Applicant: Verizon Patent and Licensing Inc., Basking Ridge, NJ (US)

(72) Inventors: Jin Yang, Orinda, CA (US); Sagiv Draznin, Walnut Creek, CA (US); Patricia R. Chang, San Ramon, CA (US); Lalit R. Kotecha, San Ramon, CA (US); Arda Aksu, Lafayette, CA (US); Arvind Aggarwal, San Ramon, CA (US); Maria G. Lam, Oakland, CA (US); Priscilla Lau, Concord, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 150 days.

This patent is subject to a terminal disclaimer.

(21) Appl. No.: 17/020,945

(22) Filed: Sep. 15, 2020

(65) Prior Publication Data

US 2020/0413300 A1  Dec. 31, 2020

Related U.S. Application Data

(63) Continuation of application No. 16/222,365, filed on Dec. 17, 2018, now Pat. No. 10,813,010.

(51) Int. Cl.
*H04W 8/08* (2009.01)
*H04W 36/00* (2009.01)
*H04W 36/14* (2009.01)

(52) U.S. Cl.
CPC ......... *H04W 36/0033* (2013.01); *H04W 8/08* (2013.01); *H04W 36/14* (2013.01)

(58) Field of Classification Search
CPC .... H04W 36/0033; H04W 36/14; H04W 8/08
See application file for complete search history.

(56) References Cited

U.S. PATENT DOCUMENTS

| | | | |
|---|---|---|---|
| 10,813,010 B2 * | 10/2020 | Yang | H04W 8/08 |
| 2014/0335839 A1 | 11/2014 | Rubin et al. | |
| 2016/0381699 A1 | 12/2016 | Rubin et al. | |
| 2019/0191341 A1 | 6/2019 | Trang et al. | |
| 2020/0007460 A1 | 1/2020 | Guim Bernat et al. | |

* cited by examiner

*Primary Examiner* — Minh Trang T Nguyen

(57) ABSTRACT

A method, a device, and a non-transitory storage medium are described in which a mobile edge computing handover service is provided. The mobile edge computing handover service provides for the prospective provisioning of a target mobile edge computing network based on mobility information pertaining to an end device. The mobile edge computing handover service includes managing the provisioning of the application or service, content, and context information in relation to a source mobile edge computing network and the target mobile edge computing network.

20 Claims, 16 Drawing Sheets

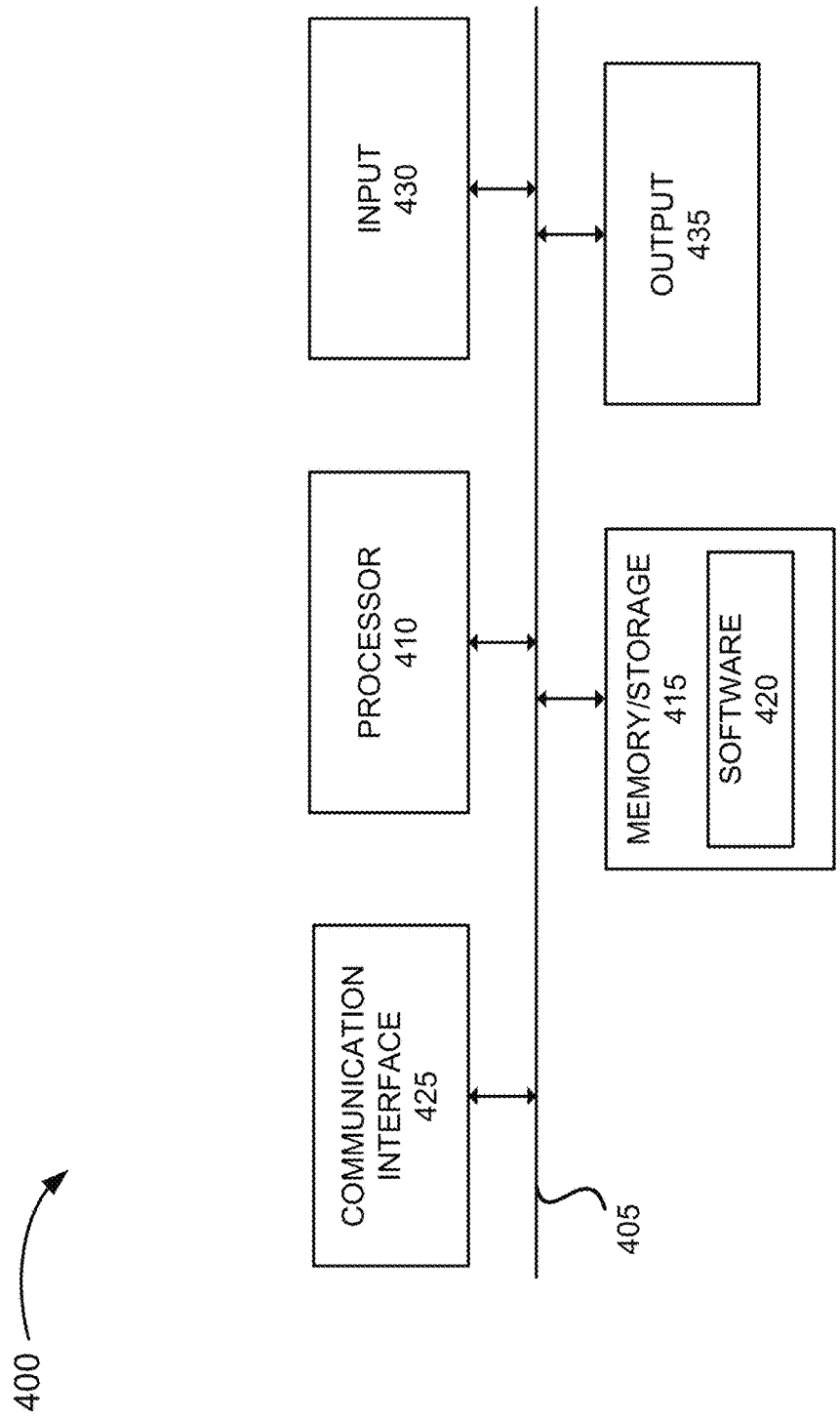

METHOD AND SYSTEM FOR EDGE COMPUTING HANDOVER SERVICE

CROSS REFERENCE TO RELATED APPLICATION

This patent application claims priority to and is a continuation of U.S. patent application Ser. No. 16/222,365, entitled "Method and System for Edge Computing Handover Service" and filed on Dec. 17, 2018, the disclosure of which is incorporated by reference herein in its entirety.

BACKGROUND

Development and design of radio access networks (RANs) present certain challenges from a network-side perspective and an end device perspective. In order to enhance performance, multi-access edge computing (MEC) (also known as mobile edge computing (MEC)) is being explored in which core network capabilities (e.g., computational, storage, communication links, etc.) are situated at the network edge in order to reduce traffic being sent to the core network.

BRIEF DESCRIPTION OF THE DRAWINGS

FIG. 4 is a diagram illustrating exemplary components of a device that may correspond to one or more of the devices illustrated and described herein;

DETAILED DESCRIPTION OF PREFERRED EMBODIMENTS

Figure 1:
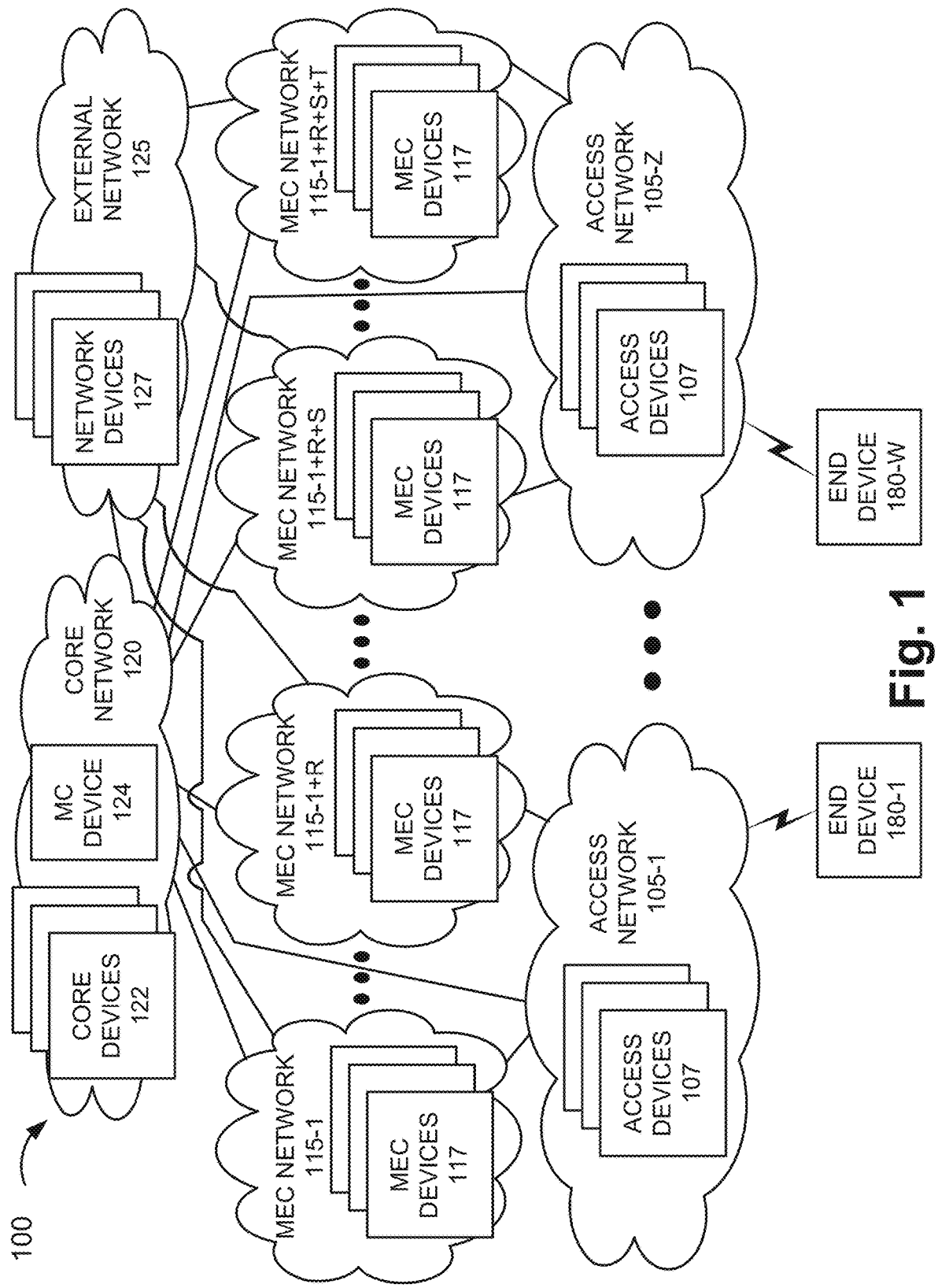
FIG. 1 is a diagram illustrating an exemplary environment in which an exemplary embodiment of a MEC handover service may be implemented.

The following detailed description refers to the accompanying drawings. The same reference numbers in different drawings may identify the same or similar elements. Also, the following detailed description does not limit the invention.

A wireless network should support various use cases, meet various performance metrics, allow for scalability and flexibility, and so forth. In the design of the wireless network, MEC is being considered. The integration of MEC may reduce the traffic sent to and received from the core network because of the local offload that the MEC provides. Additionally, the MEC may provide various services and applications to end devices with minimal latency.

Currently, when an end device is connected to a MEC network, the end device will remain connected to the same MEC network as long as the signal is not lost (e.g., actively passing data, the connection does not time out, etc.). Unfortunately, this anchoring approach leads to network resource inefficiencies because regardless of the distance traversed by the end device, as long as the signal is not lost, the end device will be served by the same MEC network. For example, if a user associated with a mobile device is connected to a MEC slice located in Walnut Creek, Calif. and the user subsequently drives to San Francisco, Calif., the mobile device will remain connected to that same MEC slice in Walnut Creek even though there is a MEC slice in San Francisco that is closer to the user.

Additionally, this anchoring approach can lead to quality of service issues from the end device perspective. For example, by virtue of extended routing to preserve the MEC as the serving anchor MEC, degradation of various performance metrics such as latency, error rate, etc., may occur. In this regard, some of the benefits provided by the integration of MEC relative to the end device may be lost.

According to exemplary embodiments, a MEC handover service is described. According to an exemplary embodiment, a network device includes logic that provides the MEC handover service. According to an exemplary embodiment, the MEC handover service manages the selection and use of a MEC network to provide an end device application and/or service (e.g., also referred to as "application service") to an end device. According to an exemplary embodiment, a MEC network may provide the network device with information indicating the application services that the MEC network supports. According to an exemplary implementation, the MEC network may announce (e.g., broadcast, unicast) to the network device the application services that the MEC network can support. This may be performed periodically and/or in response to a triggering event. For example, the triggering event may be the addition or deletion of an application service to/from the MEC network.

According to an exemplary embodiment, the MEC handover service manages a migration procedure that includes provisioning of the application service from a source MEC network to a target MEC network. According to an exemplary embodiment, the migration procedure may include copying or moving content associated with the application service from the source MEC network to the target MEC network, or from a network device external from the source MEC network to the target MEC network.

According to an exemplary embodiment, the migration procedure of the MEC handover service may be triggered based on various mechanisms, as described herein. According to an exemplary embodiment, the migration procedure may be performed in a predictive manner. According to an exemplary embodiment, the migration procedure may be triggered based on a predicted handover associated with the end device, as described herein. According to an exemplary embodiment, the MEC handover service may obtain and use context information pertaining to the end device as a basis to perform the migration procedure. According to various exemplary embodiments, the context information may include information from the end device, information from a wireless station of a wireless access network to which the end device is connected, and/or information from a network device of a core network to which the end device is connected, as described herein. According to other exemplary embodiments, the migration procedure may not be performed in a predictive manner, or only partially performed in a predictive manner, as described herein.

In view of the foregoing, the MEC handover service may avert unnecessary use of network resources based on a non-anchoring approach via which an end device may use the application service of a MEC network. Additionally, the MEC handover service may significantly reduce quality of service issues because a prospective target MEC network is managed and provisioned based on mobility information pertaining to the end device. The prospective provisioning of an application or service, content, and context information may allow continuous and uninterrupted application service to an end device, as described herein.

FIG. 1 is a diagram illustrating an exemplary environment 100 in which an exemplary embodiment of the MEC handover service may be implemented. As illustrated, environment 100 includes access networks 105-1 through 105-Z (referred to collectively as access networks 105, and individually or generally as access network 105), MEC network 115-1 through 115-1+R+S+T (referred collectively as MEC networks 115, and individually or generally as MEC network 115), a core network 120, and an external network 125. Access network 105 includes access devices 107. MEC network 115 includes MEC devices 117. Core network 120 includes core devices 122 and a Migration Controller (MC) device 124. External network 125 includes devices 127. Environment 100 further includes end devices 180-1 through 180-W (referred to collectively as end devices 180, and individually or generally as end device 180).

The number, the type, and the arrangement of network devices, and the number of end devices 180 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

According to other exemplary embodiments, environment 100 may include additional networks, fewer networks, and/or different networks than those illustrated and described herein. For example, environment 100 may not include external network 125. Additionally, or alternatively, environment 100 may include a fog network, a backhaul network, a fronthaul network, and/or another type of network not specifically mentioned herein.

Environment 100 includes communication links between the networks, between the network devices, and between end devices 180 and the network/network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the MEC handover service may use at least one of these planes of communication. Additionally, an interface of a network device (e.g., an interface defined by a standards body, such as Third Generation Partnership Project (3GPP), International Telecommunication Union (ITU), European Telecommunications Standards Institute (ETSI), etc.) may be modified in order to support the communication (e.g., transmission and reception of messages, information elements (IE), attribute value pairs (AVPs), etc.) between network devices and the MEC handover service, as described herein. According to various exemplary implementations, the interface may be a service-based interface or a reference point-based interface.

Access network 105 may include one or multiple networks of one or multiple types and technologies. For example, access network 105 may be implemented to include a Fourth Generation (4G) radio access network (RAN) (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), an RAN of an LTE-A Pro network, a next generation RAN (e.g., a Fifth Generation (5G)-access network (5G-AN) or a 5G-RAN (referred to herein as simply a 5G-RAN)), and/or another type of future generation RAN. Access network 105 may include other types of RANs (e.g., a Third Generation (3G) RAN, a 3.5G RAN, a UTRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, and/or an Evolution Data Optimized (EV-DO) RAN).

Access network 105 may communicate with other types of access networks, such as, for example, a WiFi network, a Worldwide Interoperability for Microwave Access (WiMAX) network, a local area network (LAN), a Citizens Broadband Radio System (CBRS) network, a cloud RAN, a wired network (e.g., optical, cable, coaxial, copper, etc.), or another type of network that provides access to or can be used as an on-ramp to access network 105, MEC network 115, and/or core network 120.

Access network 105 may include different and multiple functional splitting, such as options 1, 2, 3, 4, 5, 6, 7, or 8 that relate to the splitting of the physical layer, Media Access Control (MAC), Radio Link Control (RLC), and Packet Data Convergence Control (PDCP), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA), network slicing, coordinated multipoint (CoMP), and/or another type of connectivity service.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technology (RAT), etc.), wireless standards, wireless frequencies/bands, and different segments of radio spectrum (e.g., centimeter (cm) wave, millimeter (mm) wave, below 6 Gigahertz (GHz), above 6 GHz, licensed radio spectrum, unlicensed radio spectrum, carrier frequency, etc.).

Depending on the implementation, access network 105 may include one or multiple types of network devices that are illustrated in FIG. 1 as access devices 107. For example, access devices 107 may be implemented to include an evolved Node B (eNB), an eLTE eNB, a next generation Node B (gNB), a base station (BS), a base transceiver station (BTS), a Node B, a remote radio head (RRH), an RRH and a baseband unit (BBU), a BBU, a radio network controller (RNC), a small cell node (e.g., a picocell device, a femtocell device, a microcell device, a home eNB, a repeater, etc.), or another type of network device that provides a wireless access service. According to an exemplary embodiment, access device 107 includes logic that provides a MEC handover service, as described herein.

MEC network 115 includes a platform that provides an application service at the edge of a network, such as access network 105. MEC network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology.

Depending on the implementation, MEC network 115 may include various types of network devices that are illustrated in FIG. 1 as MEC devices 117. For example, MEC devices 117 may include virtualized network functions (VNFs), multi-access (MA) applications/services, and/or servers for use by end devices 180. Additionally, for example, MEC devices 117 may include other types of network devices, such as a network function virtualization orchestrator (NFVO), a virtualized infrastructure manager (VIM), an operations support system (OSS), a local domain name server (DNS), a virtual network function manager (VNFM), and/or other types of network devices (e.g., routers, core devices 122, etc.), and network resources (e.g., storage devices, communication links, etc.). According to an exemplary embodiment, MEC devices 117 of MEC network 115 may include logic that provides a MEC handover service.

MEC devices 117 may provide various end device and user device applications or services. For example, the application services may pertain to broadband access in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

Core network 120 may include one or multiple networks of one or multiple network types and technologies. Core network 120 may include a complementary network of access network 105. For example, core network 120 may be implemented to include an Evolved Packet Core (EPC) of an LTE, an LTE-A, an LTE-A Pro, a next generation core (NGC) network, and/or a legacy core network.

Depending on the implementation of core network 120, core network 120 may include various types of network devices that are illustrated in FIG. 1 as core devices 122. For example, core devices 122 may include a mobility management entity (MME), a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core network 120 may include additional, different, and/or fewer network devices than those described.

According to an exemplary embodiment, migration controller 124 includes logic that provides a MEC handover service, as described herein. According to an exemplary embodiment, as illustrated, migration controller 124 may be implemented as a network device included in core network 120. According to other exemplary embodiments, although not illustrated, migration controller 124 may reside in a network different from core network 120. Migration controller 124 is described further below.

External network 125 may include one or multiple networks of one or multiple network types and technologies. For example, external network 125 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, a private network, or other type of network that hosts an end device application or service, or another type of end device asset.

Depending on the implementation of external network 125, external network 125 may include various network devices depicted in FIG. 1 as network devices 127. For example, network devices 127 may provide various applications, services, or another type of end device asset, such as a server (e.g., web, application, cloud, etc.), mass storage device, data center devices, routers, and/or other types of network devices pertaining to various network-related functions. According to an exemplary embodiment, one or multiple devices 127 may include logic that provides a MEC handover service, as described herein.

End device 180 includes a device that has computational and wireless communication capabilities. End device 180 may be implemented as a mobile device or a portable device, a device operated by a user, or a device not operated by a user. For example, end device 180 may be implemented as a mobile broadband device, a smartphone, a computer, a tablet, a netbook, a phablet, a wearable device, a vehicle support system, a drone, or some other type of mobile wireless device. According to various exemplary embodiments, end device 180 may be configured to execute various types of software (e.g., applications, programs, etc.). The number and the types of software may vary among end devices 180. End device 180 may support one or multiple RATs (e.g., 4G, 5G, etc.), one or multiple frequency bands, network slicing, DC service, and so forth. Additionally, end device 180 may include one or multiple communication interfaces that provide one or multiple (e.g., simultaneous or non-simultaneous) connections via the same or different RATs, frequency bands, access devices 107, and so forth. According to an exemplary embodiment, end device 180 may include logic that provides a MEC handover service, as described.

FIGS. 2A-2J are diagrams illustrating exemplary processes of the MEC handover service in an exemplary environment 200 that is consistent with environment 100, as previously described, and according to various exemplary scenarios. For example, core devices 122 of core network 120 may include an MME and/or AMF (MIME/AMF) 210, in addition to other types of core devices previously described which are not illustrated. According to an exemplary embodiment, MME/AMF 210 and migration controller 124 may be communicatively coupled via a communication link and interfaces that support the MEC handover service. According to an exemplary embodiment, each MEC network 115 may include a MEC device 117 that is communicatively coupled with migration controller 124 via a communication link and interfaces that support the MEC handover service. According to some exemplary implementations, the MEC device 117 may include core device functionality (e.g., an MME/AMF functionality (e.g., a local MME/AMF), a PGW and/or UPF functionality (e.g., a local PGW/UPF), etc.). According to other exemplary implementations, the MEC device 117 may be included in a non-core device (e.g., a VNFM, etc.) or may be a dedicated network device (e.g., a MEC-to-MC interface device, etc). Although not illustrated, according to various exemplary embodiments, external network 125 and network devices 127 may or may not be included in environment 200.

According to some exemplary embodiments, end device 180 may be configured to communicate with migration controller 124 directly or indirectly (e.g., via MME/AMF 210, via a local MEC device 117, or via another network device residing in MEC network 115 and/or core network 120). According to other exemplary embodiments, information pertaining to end device 180 may be obtained by migration controller 124 from network-side devices of core network 120 and MEC devices 117 of MEC networks 115.

Figure 2A:
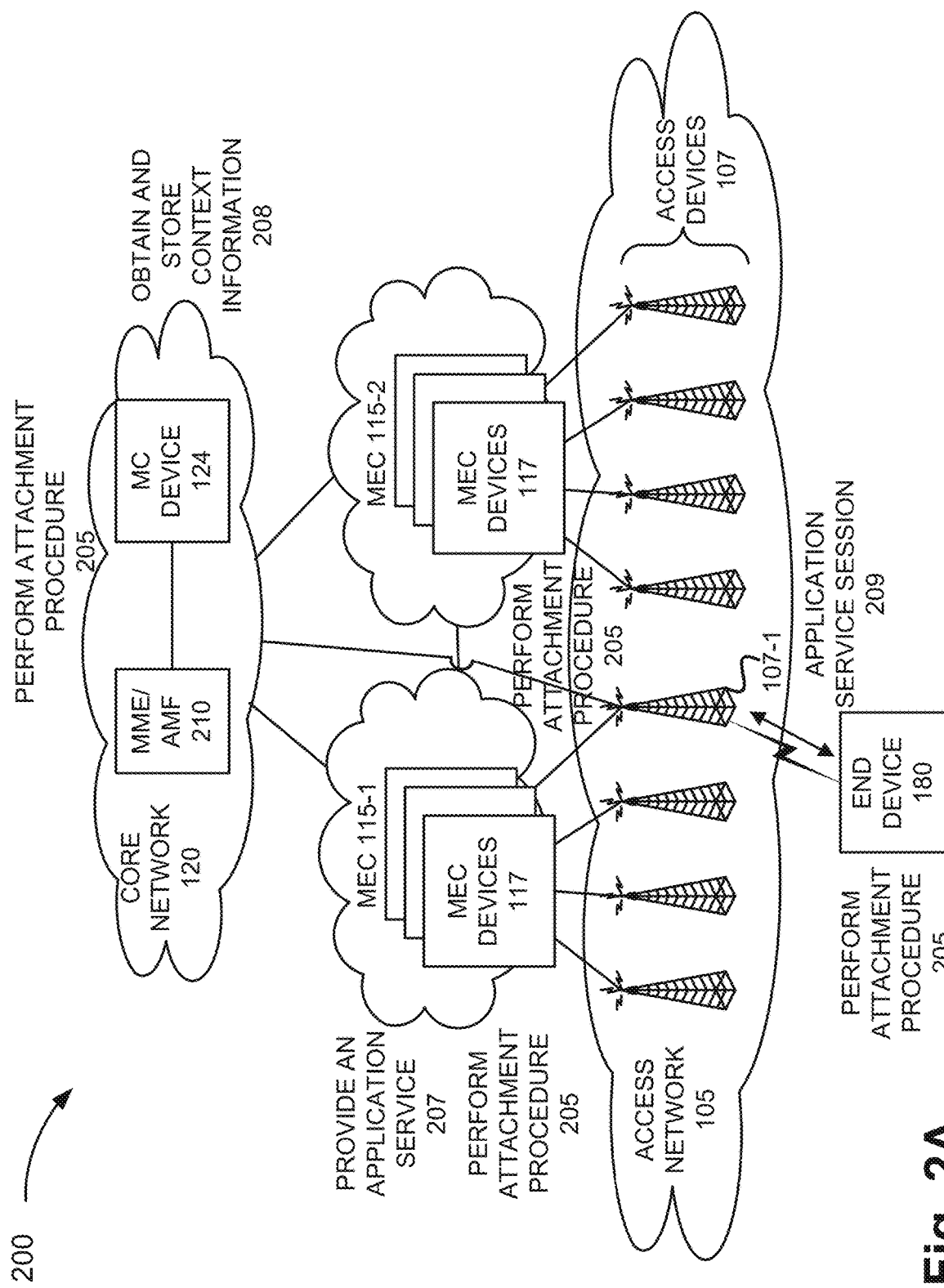
FIGS. 2A-2J are diagrams illustrating exemplary processes of exemplary embodiments of the MEC handover service according to exemplary scenarios.

Referring to FIG. 2A, according to an exemplary scenario, assume that end device 180 and access network 105 perform an attachment procedure 205. For example, end device 180 may establish a radio resource control (RRC) connection with access device 107-1. Additionally, according to an exemplary embodiment, end device 180 and core network 120 may perform a partial or full attachment procedure 205. For example, end device 180 may register and authenticate with MME/AMF 210 of core network 120. Depending on various exemplary embodiments, end device 180 may or may not establish a bearer (e.g., a default bearer, etc.) with a PGW or a UPF of core network 120 (not illustrated).

According to an exemplary embodiment, end device 180 may be assigned a global network address by core network 120. For example, the PGW or the SMF may assign the global network address (e.g., a global Internet Protocol (IP) address) to end device 180. The PGW or the SMF may provide the assigned global network address to migration controller 124. According to other exemplary embodiments, migration controller 124 may assign end device 180 with a global network address. In either scenario, migration controller 124 may obtain the global network address of end device 180 and store the global network address as context information. A further description of the context information used in support of the MEC handover service is described herein.

According to an exemplary embodiment, MEC devices 117 of MEC network 115-1 and end device 180 may perform an attachment procedure 205 that includes providing an application service 207 to end device 180. According to an exemplary embodiment, MEC network 115-1 may assign a network address (e.g., a local IP address) to end device 180. MEC network 115-1 may provide context information to migration controller 124. According to an exemplary embodiment, the context information includes an identifier of end device 180 (e.g., the local network address for end device 180 and/or another type of identifier (e.g., International Mobile Subscriber Identity (IMSI), an International Mobile Equipment Identity (IMEI), etc.) and application service information. For example, the application service information may include an application identifier that identifies the application service provisioned to end device 180. Additionally, for example, the application service information may include other context information, such as whether or not a third party network device (e.g., a third party service that hosts content, network device 127, etc.), which is external from MEC network 115-1 (e.g., external network 125), contributes to the provisioning of the application service, a network address of the third party network device, and other context information that may be used in support of the MEC handover service, as described herein. For purposes of illustration and as described herein, migration controller 124 may obtain and store context information 208 from various network devices pertaining to end device 180. Additionally, as illustrated, assume an application service session 209 is established between end device 180 and MEC 115-1.

Figure 2B:
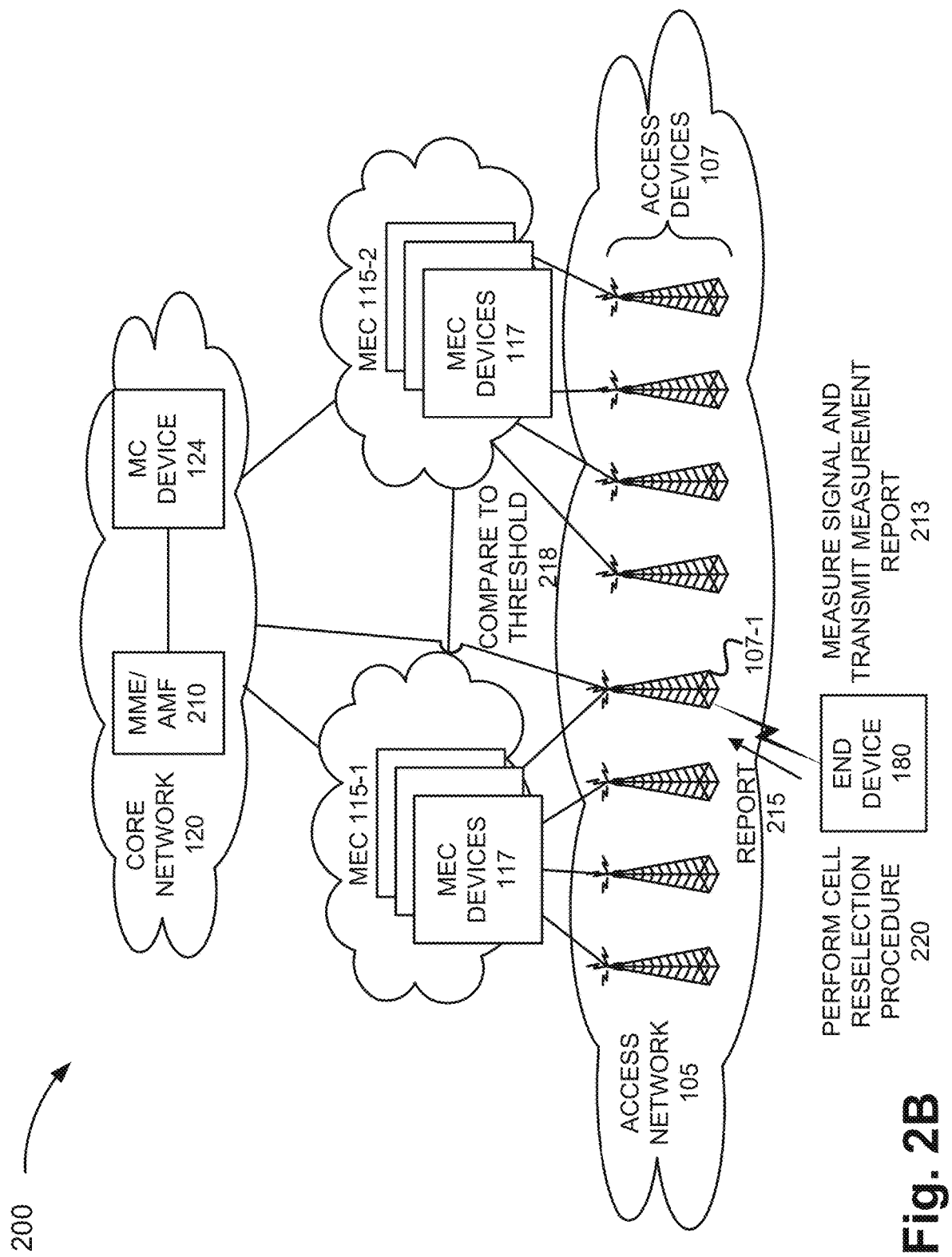
Figure 2C:
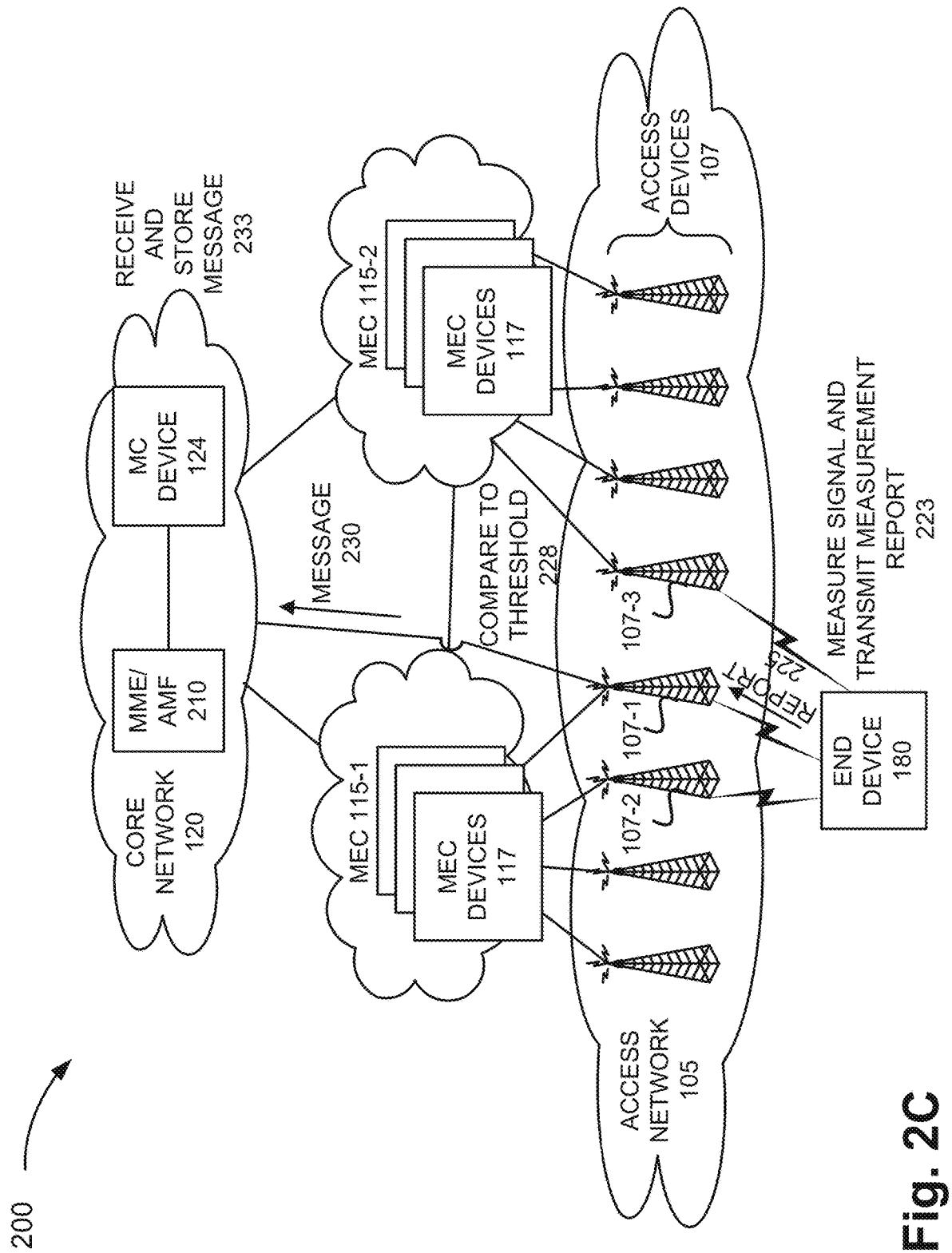

Referring to FIG. 2B, end device 180 may measure a signal of access device 107-1 and transmit a measurement report 213 to access device 107-1. For example, the measurement and transmission of the measurement report may be based on network configuration information (e.g., included in RRC messages, etc.) from access device 107-1. According to an exemplary implementation, a measurement report 215 may include an RSRP value and/or another type of signal quality/channel condition value, as described herein. According to an exemplary embodiment, access device 107-1 may compare the signal quality/channel condition value to a threshold value 218. In response to determining that the threshold value is not satisfied, access device 107-1 may direct end device 180 to perform a cell reselection procedure 220. According to other exemplary embodiments, end device 180 may compare the signal quality/channel condition value to a threshold value, and in response to determining that the threshold value is not satisfied, end device 180 may perform the cell reselection procedure. For example, referring to FIG. 2C, end device may measure a signal of a neighbor access device 107 (e.g., access devices 107-2 and 107-3), and transmit a measurement report 223 to access device 107-1. A measurement report 225 may include a signal quality/channel condition value pertaining to neighbor access devices 107. According to an exemplary embodiment, access device 107-1 may compare the signal quality/channel condition value to a threshold value 228. In response to determining that the threshold value is satisfied, access device 107-1 may transmit a message 230 to migration controller 124, which is received and stored 233 by migration controller 124. For example, message 230 may include information that indicates a handover procedure is to take place, an identifier of a target neighbor access device 107, and an identifier of end device 180.

Figure 2D:
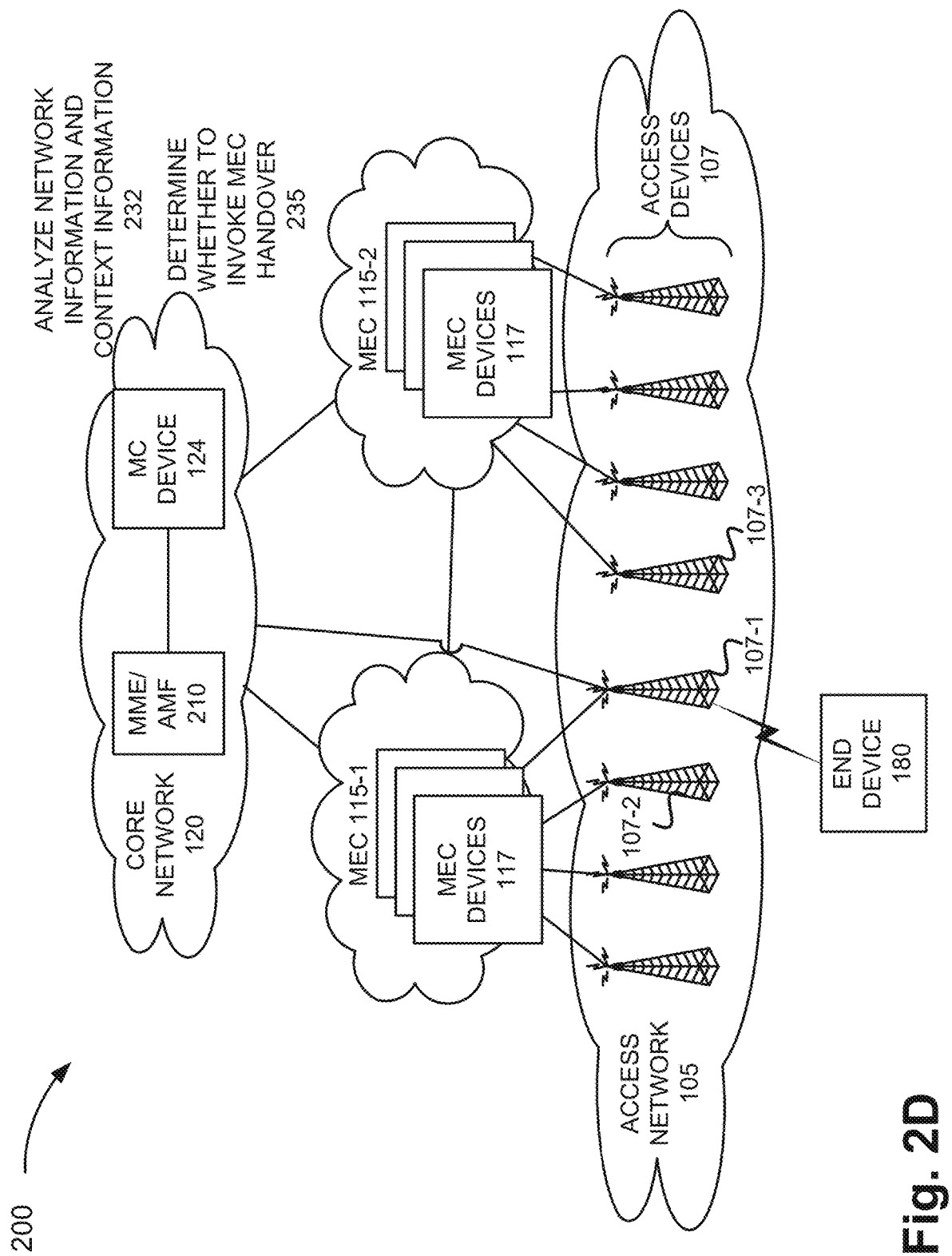

Referring to FIG. 2D, in response to receiving message 230, migration controller 124 may analyze network information and context information 232, and determine whether to invoke a MEC handover 235. For example, the network information may include information that correlates access device information to MEC network information, as described herein. Migration controller 124 may store the network information or access the network information from another network device (e.g., a storage device) (not illustrated). Additionally, migration device 14 may store the context information or access the context information from another network device. Exemplary network information and exemplary context information are described further below.

Figure 3A:
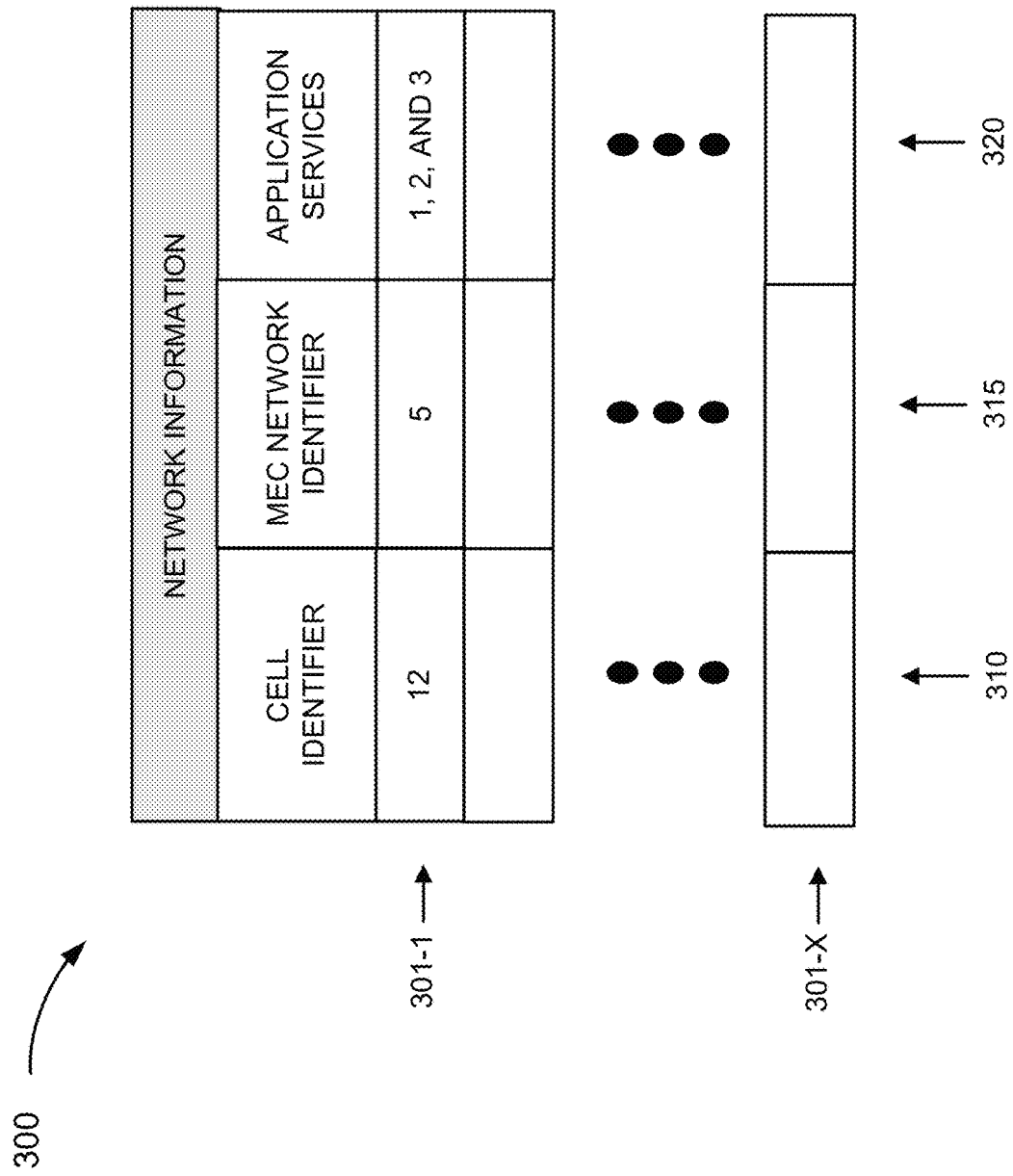
FIG. 3A is a diagram illustrating exemplary network information of the MEC handover service.

FIG. 3A is a diagram illustrating exemplary network information that may be stored in a table 300. As illustrated, table 300 may include a cell identifier field 310, a MEC network identifier field 315, and an application services field 320. As further illustrated, table 300 includes entries 301-1 through 301-X (also referred as entries 301, or individually or generally as entry 301) that each includes a grouping of fields 310, 315, and 320 that are correlated (e.g., a record, etc.). Network information is illustrated in tabular form merely for the sake of description. In this regard, network information may be implemented in a data structure different from a table (e.g., a list, an array, a flat file, an object, a container, etc.) or other type of data storage structure (e.g., a database, etc.). The values illustrated in entry 301-1 are exemplary.

Cell identifier field 310 may store data indicating an identifier of a cell associated with access device 107. The identifier may be locally or globally unique or not. Cell identifier field 310 may also store other type of information pertaining to the cell, such as geographic location information (e.g., latitude/longitude coordinates, physical cell identifier, tracking area code, etc.).

MEC network identifier field 315 may store data indicating an identifier for MEC network 115. For example, each MEC network 115 may be assigned a unique MEC identifier. Additionally, MEC network identifier field 315 may store data indicating network resource information pertaining to each MEC network 115. For example, MEC network identifier field 315 may store data indicating current load information (e.g., available relative to capacity). Application services field 320 may store data indicating application services supported by MEC network 115.

According to other exemplary implementations, table 300 may store additional, fewer, and/or different instances of network information in support of the MEC handover service, as described herein. For example, table 300 may store data indicating an identifier of access device 107, an identifier of a sector of the cell, and/or other information pertaining to the cell and/or access device 107 (e.g., RAT, frequency band, type of access device 107 (e.g., eNB, gNB, etc.), size of the cell (e.g., small, large, etc.), etc.). Additionally, according to exemplary implementation, a field of table 300 may be updated. For example, as described herein, application services field 320 may be continuously updated so that a current state of the application services supported by each MEC network 115 may be known. Migration controller 124 may use this information in determining whether a target MEC network, which is subject to a MEC handover, can support the application service. As described herein, MEC network 115 may provide migration controller 124 (or the storage device) with information indicating the application services that the MEC network 115 supports. According to an exemplary implementation, MEC network 115 may announce (e.g., broadcast, unicast) to migration controller 124/storage device the application services that the MEC network 115 can support. This may be performed periodically and/or in response to a triggering event. For example, the triggering event may be the addition or deletion of an application service to/from MEC network 115. According to another exemplary implementation, the migration controller 124 may query MEC network 115 for this information during a migration procedure, as described herein.

Figure 3B:
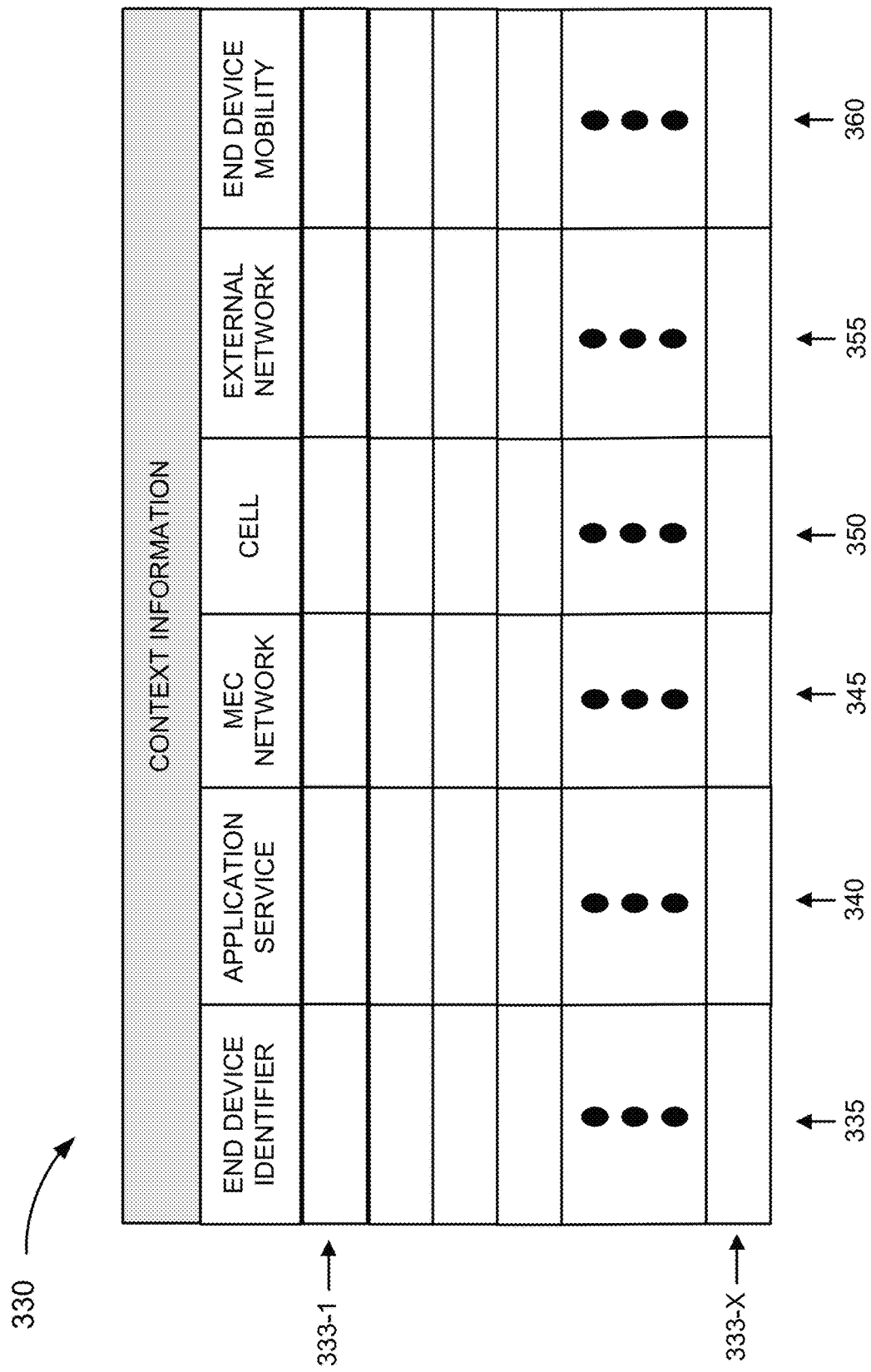
FIG. 3B is a diagram illustrating exemplary context information of the MEC handover service.

FIG. 3B is a diagram illustrating exemplary context information that may be stored in a table 300. As illustrated, table 300 may include an end device identifier field 335, an application service field 340, a MEC network field 345, a cell field 350, an external network field 355, and an end device mobility field 360. As further illustrated, table 300 includes records 333-1 through 333-X (also referred to as records 333, or individually or generally as record 333) that each includes a grouping of fields 335, 340, 345, 350, 355, and 360. Context information is illustrated in tabular form merely for the sake of description. In this regard, network information may be implemented in a data structure different from a table (e.g., a list, an array, a flat file, an object, a container, etc.) or other type of data storage structure (e.g., a database, etc.). As described herein, various instances of context information may be obtained from various network devices of environment 100, such as network devices of core network 120, MEC network 115, and access network 105.

End device identifier field 305 may store an identifier of end device 180. For example, the identifier may include a global network address and/or a local network address assigned to end device 180. Additionally, or alternatively, the identifier may include an IMSI or another type of identifier that uniquely identifies end device 180.

Application service field 340 may store information pertaining to an application service provided to end device 180 by MEC network 115 or MEC network 115 and external network 125. For example, application service field 340 may store an identifier of the application service. Application service field 340 may store other types of context information pertaining to the application service, such as a performance metric parameter and value (e.g., a minimum latency value, a quality-of-service (QoS) requirement, etc.). Application service field 340 may pertain to active application service session between end device 180 and, MEC device 117 or network device 127 and MEC device 117.

MEC network field 345 may store MEC information pertaining to the application service of application service field 340. For example, the MEC information may include an identifier of a MEC network 115 that provides the application service identified in field 340. Additionally, for example, the MEC information may include a network address of MEC device 117 (e.g., a MEC server providing the application service), an application service session identifier, and other context information pertaining to an application service session with end device 180 (e.g., a bearer identifier, etc.).

Cell field 350 may store cell information associated with access device 107 via which end device 180 is provided the application service. For example, cell field 350 may store an identifier of the cell and/or access device 107. Additionally, for example, cell field 350 may store other context information pertaining to the application service session with end device 180 (e.g., a data radio bearer identifier, an application service session identifier, frequency band, RAT, type of access device 107, etc.).

External network field 355 may store external network information pertaining to the application service of application service field 340. For example, the external network information may include an identifier of network device 127 (e.g., a network address, an access point name (APN), etc.). Additionally, for example, external network information may store other context information pertaining to the application service session with end device 180 (e.g., an application session identifier, a port number, a bearer identifier, an identifier of a content or other asset, a network address of end device 180, etc.).

Mobility information field 360 may store mobility information pertaining to end device 180. For example, the mobility information may include geographic coordinates, a tracking area code, a physical cell identifier, and/or other types of location information. According to some exemplary implementations, the mobility information may include historical tracking information stemming from previous attachments/detachments of end device 180. For example, the historical information may be obtained from an MME, an AMF, or a subscription server (e.g., a home subscriber server (HSS), a user data management (UDM) device, etc.). The historical information may include, for example, the application service used by end device 180, access devices 107 connected to by end device 180, MEC networks 115 used, date, day, and time information, as well as other types of context information (e.g., frequency of use of route, etc.). In this way, the migration controller 124 may predict the need of a MEC handover. For example, a user of end device 180 may regularly or otherwise travel along a path in which MEC handover had been previously performed. Alternatively, migration controller 124 may predict the need of a MEC handover based on the other types of current tracking information and the network information (e.g., table 300). Further, as described herein, migration controller 124 may predict the need to perform a MEC handover based on measurement reports from end device 180. For example, end device mobility information may store information included in message 230 (e.g., target neighbor access device 107).

According to other exemplary implementations, table 330 may store additional, fewer, and/or different instances of context information in support of the MEC handover service, as described herein.

Referring to back to FIG. 2D, according to an exemplary embodiment, migration controller 124 may use the network information and the context information to determine whether a source access device 107 and a target access device 107 are connected to a same or different MEC network 115. For example, cell identifier information and MEC identifier information of the network information may be correlated to cell information, MEC network information, and end device mobility information of the context information.

According to some exemplary scenarios, based on the analysis of the network information and the context information, migration controller 124 may determine that the MEC handover service is not to be invoked because the source access device and the target access device are connected to the same MEC network 115. For example, when the target access device is access device 107-2, migration controller 124 may determine that the MEC handover service is not to be performed. According to other exemplary scenarios, migration controller 124 may determine that the MEC handover service is to be invoked because the source access device and the target access device are not connected to the same MEC network 115. For example, when the target access device is access device 107-3, migration controller 124 may determine that the MEC handover service is to be performed.

Figure 2E:
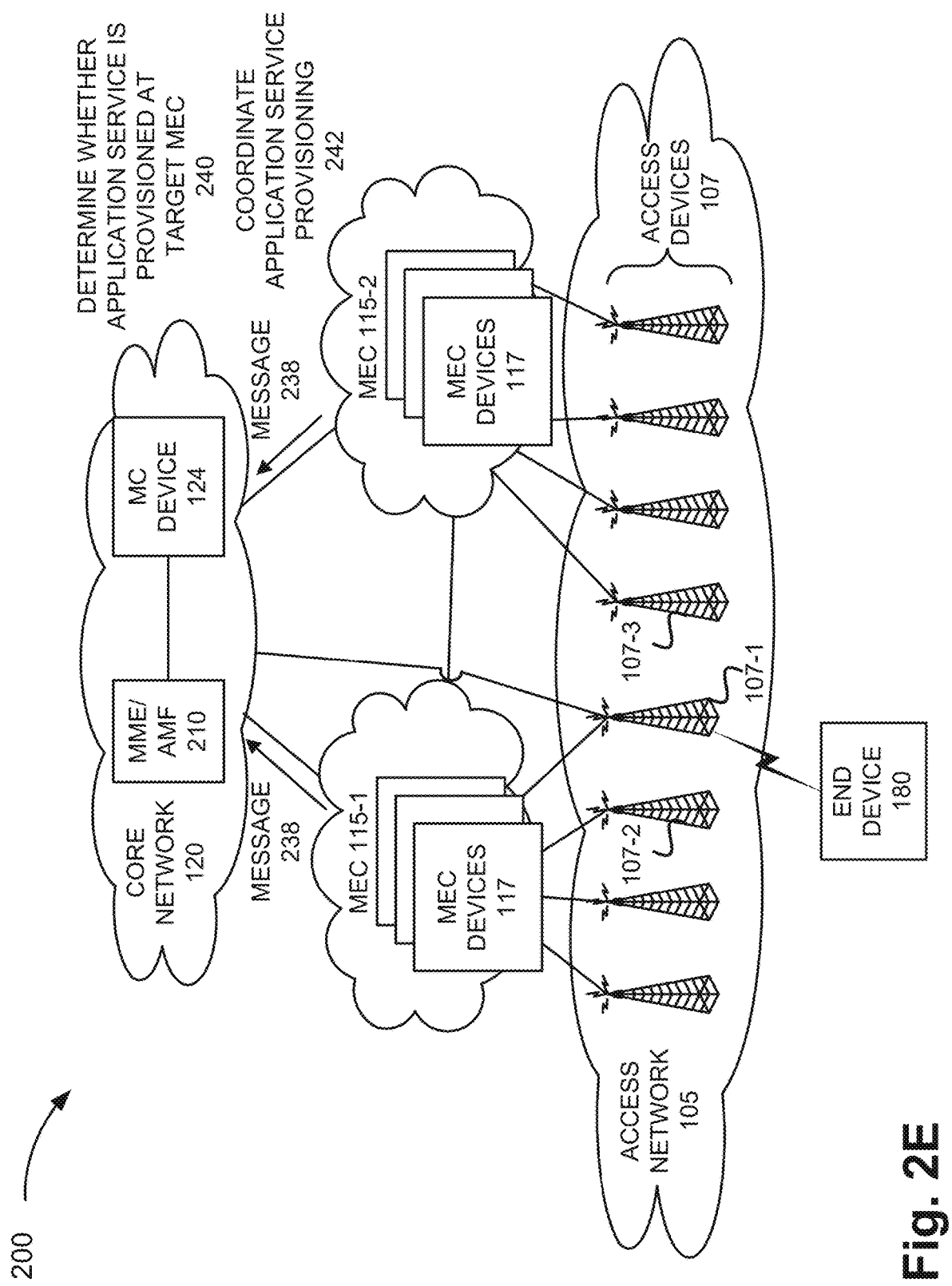

Referring to FIG. 2E, assume that migration controller 124 determines that the MEC handover service is to be performed. For example, assume that access device 107-3 is the target access device and MEC network 115-2 is the target MEC network.

As previously described, MEC networks 115 may periodically, trigger-based, or otherwise, provide migration controller 124 or a storage device (not illustrated) with application services information that indicates the application services supported by MEC networks 115. According to some exemplary implementations, the application services information may include identifying the application services currently hosted, the number of VNFs (e.g., MEC servers, etc.) currently supporting an application service, MEC network capacity and current allocation information pertaining to an application service, and/or other types of state information of MEC network 115 that would assist migration controller 124 in determining whether MEC network 115 can be provisioned and used to provide the application service. For purposes of illustration, MEC networks 115-1 and 115-2 are shown to each transmit a message 238 that includes the application services information.

According to an exemplary embodiment of the MEC handover service, migration controller 124 may determine whether the target MEC network is currently provisioned. For example, based on the context information pertaining to end device 180, migration controller 124 may identify the application service (e.g., application service field 340). Additionally, based on the network information, migration controller 124 may determine whether the application service is currently provisioned at MEC network 115-2. According to some exemplary scenarios, migration controller 124 may determine that the target MEC network (e.g., MEC network 115-2) is currently provisioned with the application service. In response to this determination, migration controller 124 may perform other steps of the MEC handover service, as described herein. For example, migration controller 124 may determine whether the target MEC network has the capacity to support another application service session, whether content associated with the application service needs to be obtained, how to manage the content provisioning when the content needs to be obtained, as described herein. According to other exemplary scenarios, migration controller 124 may determine that the target MEC network (e.g., MEC network 115-2) is currently not provisioned with the application service. According to such an exemplary scenario, in response to this determination, migration controller 124 may coordinate the provisioning of the application service 242. For example, the application service may be hosted by network device 127 or MEC devices 117 of MEC network 115-2 that host the application or service may be at full capacity. As a result, migration controller 124 may communicate with network device 127 to provision the application or service, or cause MEC network 115-2 to add another VNF (e.g., MEC server) to host the application or service.

Figure 2F:
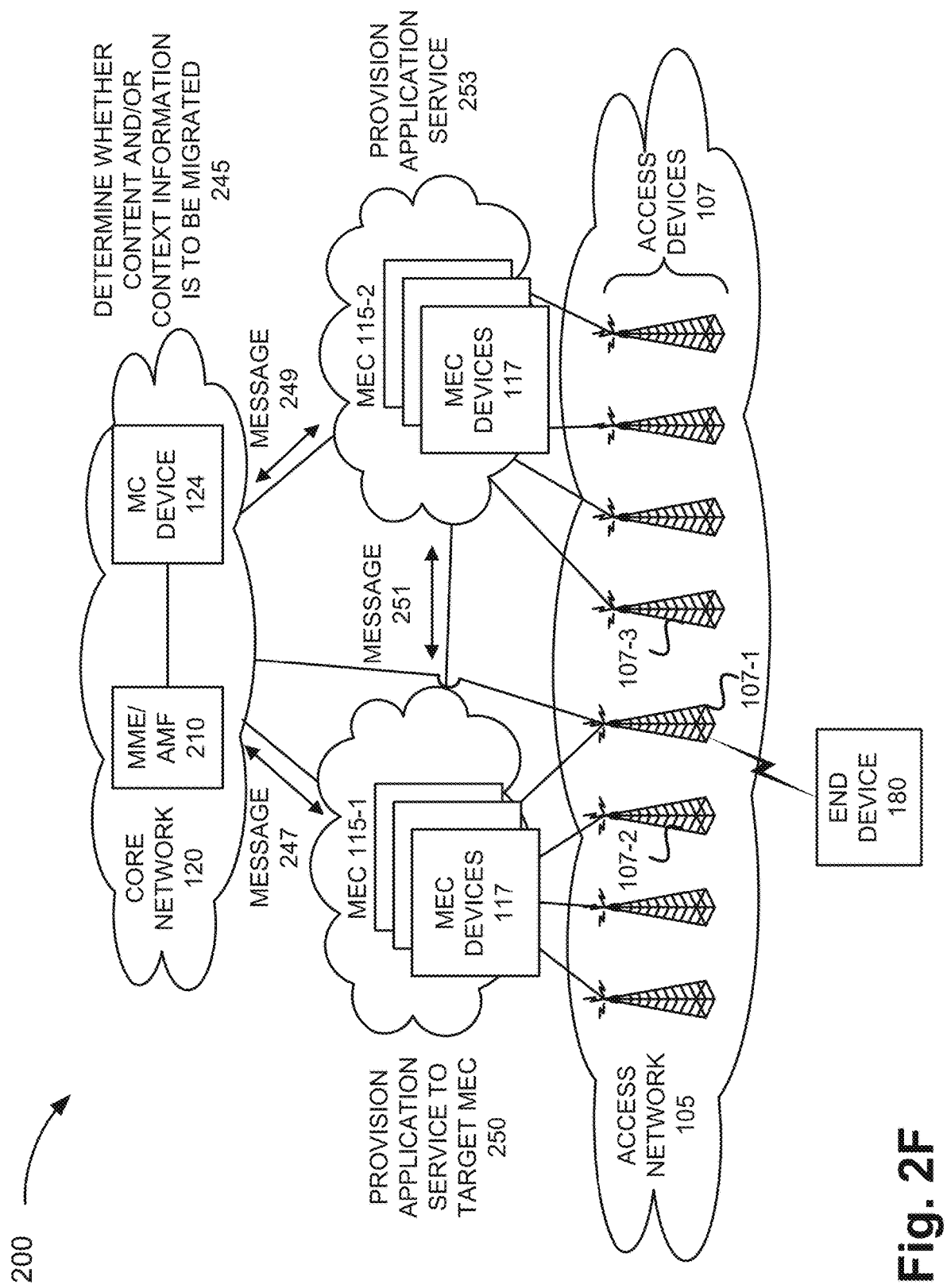

Referring to FIG. 2F, assume that migration controller 124 determines that the application service is provisioned at MEC network 115-2. Migration controller 124 may determine whether content and/or context information is to be migrated 245 in support of the provisioning of the application service. For example, a video streaming service uses content for which to stream, and may include context information (e.g., the current position of the content that a user may be viewing, etc.). In this regard, migration controller 124 may migrate a movie and context information associated with the movie, from the source MEC network (e.g., MEC network 115-1) or network device 127 to the target MEC network (e.g., MEC network 115-2) as a part of the provisioning of the application service. Alternatively, for example, a mobile video surveillance service may not require the migration of content and context information. According to another example, an application service may require the migration of content or context information, but not both. For example, a navigation service may not require content (e.g., maps, etc.), but requires context information (e.g., a destination, a preference pertaining to the requested route (e.g., fastest, shortest, etc.)). Migration controller 124 may make this determination based on network information. For example, application services field 320 may store data indicating these attributes of an application service.

For purposes of illustration and description, FIG. 2F illustrates that a message 247, a message 249, and a message 251 may be communicated between MEC networks 115 and migration controller 124 to facilitate the provisioning of the application service, content, and context information. For example, message 247 and message 249 may each include information pertaining to the MEC handover (e.g., identifying the application service, session, end device 180, etc.).

Additionally, for example, message 251 may include information that coordinates the migration of content and/or context information from MEC network 115-1 to MEC network 115-2. According to various exemplary implementations, a content container, which includes the content and/or the context information, may be copied or moved to MEC network 115-2, or a content container may be swapped (e.g., use a cache container and provision the content and/or context information). Migration controller 124 may manage the migration of the content container based on whether the content is already available at MEC network 115-2, available network resources to host the content container, and so forth, to enable continuous and uninterrupted application service to end device 180. According to some exemplary implementations, migration controller 124 may update routing tables to route content to MEC network 115-2.

In accordance with the application service migration, MEC network 115-1 may provision the application service to the target MEC network 250, and MEC network 115-2 may provision the application service 253.

Figure 2G:
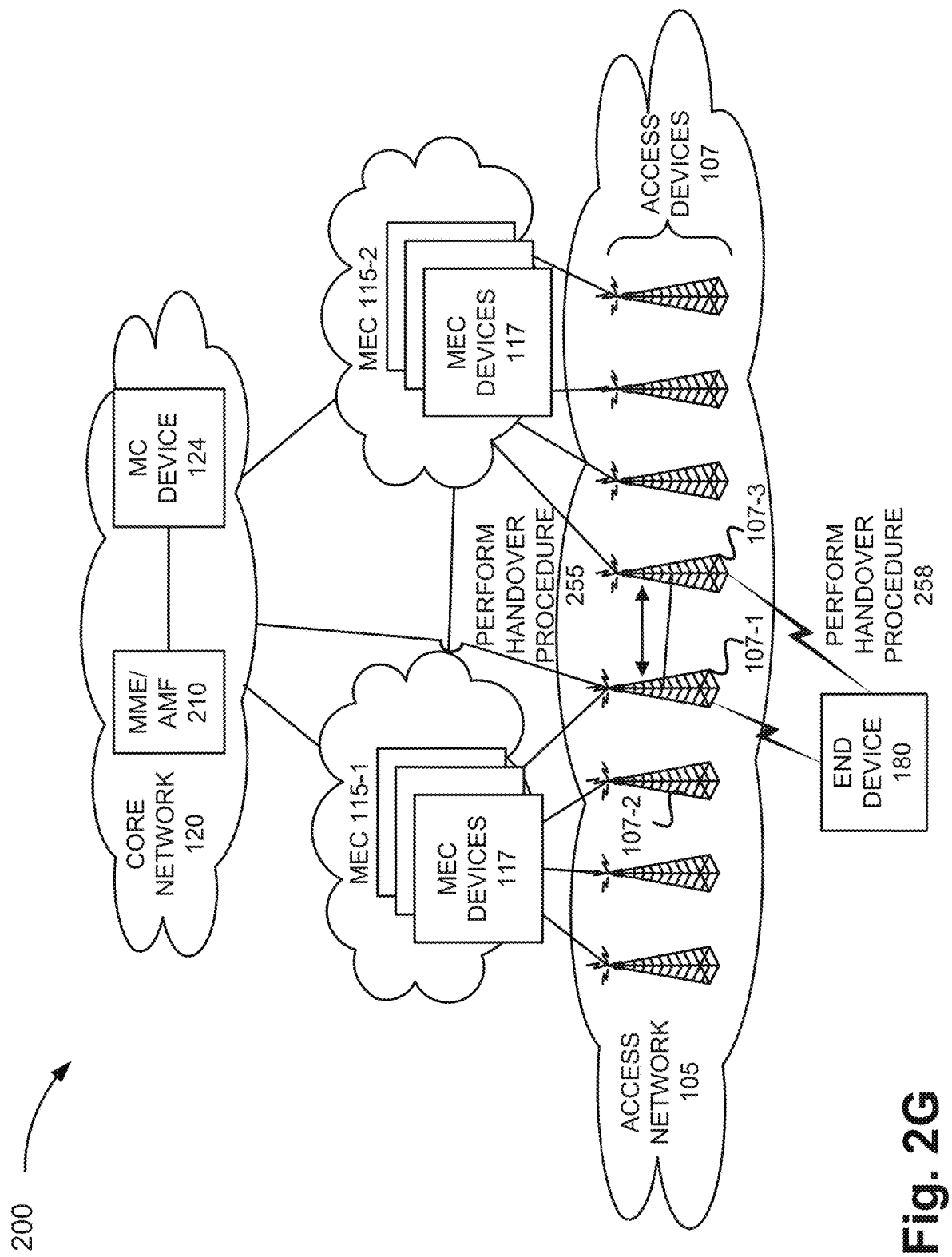
Figure 2H:
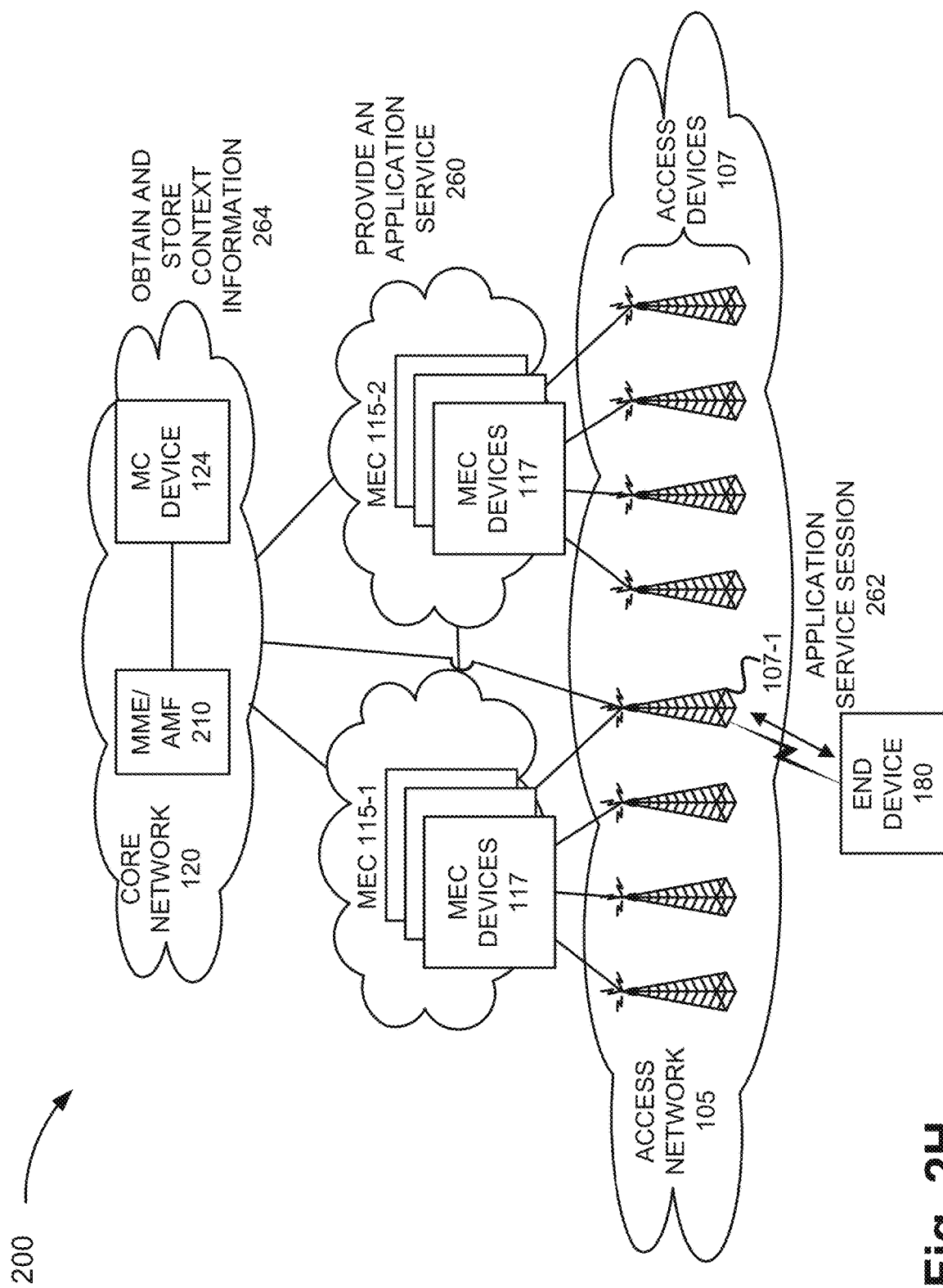

Referring to FIG. 2G, access devices 107-1 and 107-3 may perform a handover procedure 255, and end device 180 may perform a handover procedure 258. According to some exemplary implementations, the target MEC network may make a new connection with end device 180 prior to the termination of the current connection with source MEC network. According to other exemplary implementations, the MEC handoff may be suspended until conditions permit. Referring to FIG. 2H, subsequent to the execution of the MEC handover service, MEC network 115-2 provides the application service 260 to end device 180 in which an application service session 262 is established. Migration controller 124 may obtain and store updated context information 264 pertaining to end device 180.

Figure 2I:
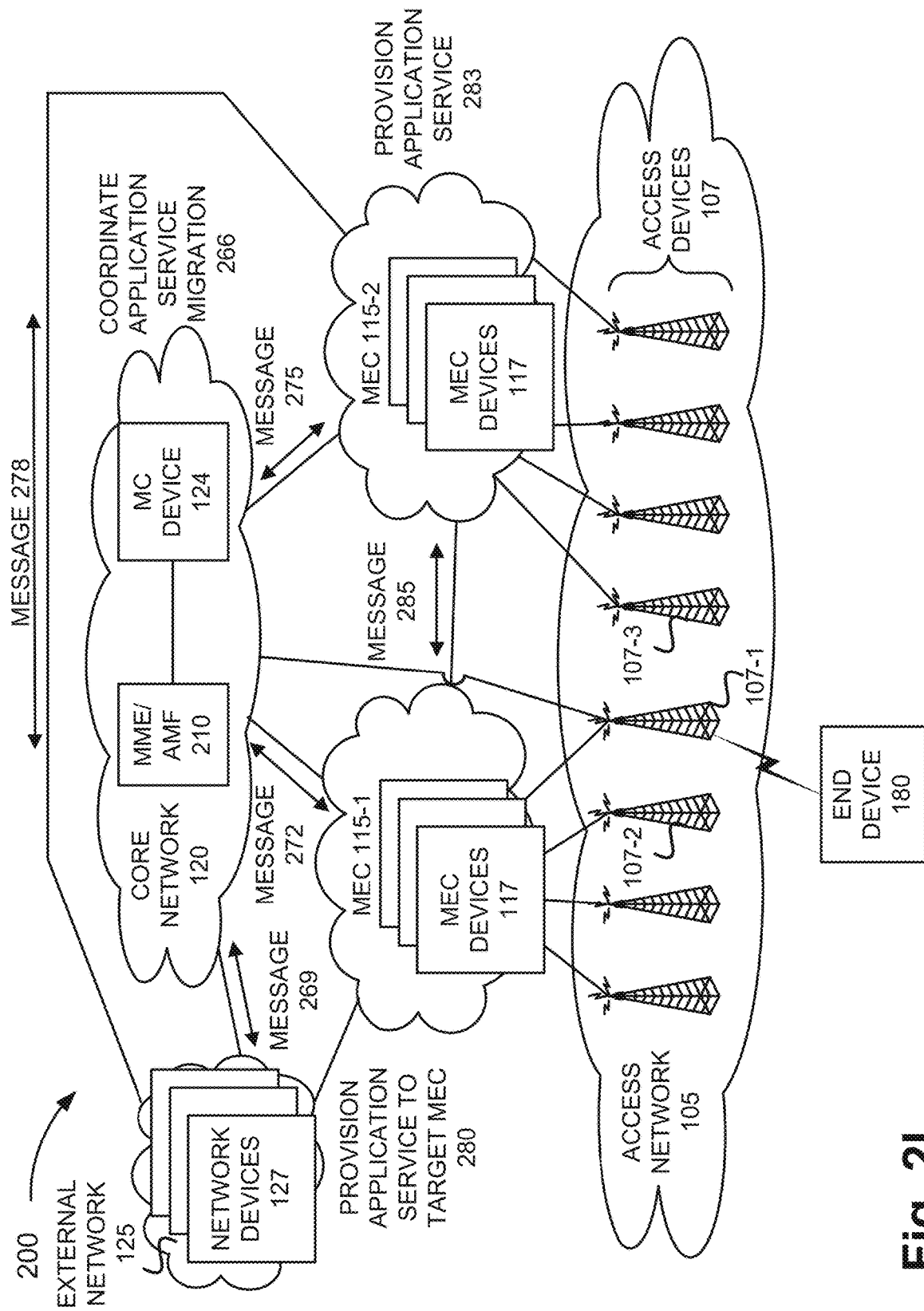

Referring to FIG. 2I, according to other exemplary scenarios in which network device 127 may be included in the provisioning of the application service, various messages may be exchanged to coordinate the provisioning of the application service 266. For purposes of illustration and description, FIG. 2I illustrates that a message 269, a message 272, a message 275, a message 278, and a message 285 may be communicated between MEC networks 115, network device 127 of external network 125, and migration controller 124 to facilitate the provisioning of the application service, content, and context information. For example, message 269 may include information pertaining to the MEC handover (e.g., identifying the application service, session, end device 180, content, context information, etc.).

As previously described, other types of mobility information pertaining to end device 180 may be used as a basis to predict the execution of the MEC handover service. For example, the mobility information may include the geographic coordinates, a physical cell identifier, a tracking area code pertaining to end device 180. For example, tracking area update information and/or location information may be provided by end device 180, access device 107, and/or MME/AMF 210 to migration controller 124. According to other exemplary embodiments, as previously described, subscription information pertaining to end device may include historical information relating to the mobility of end device 180. According to still other exemplary embodiments, end device 180 may provide useful information that provides a basis to predict mobility. For example, various types of end user applications, such as a personal calendar or a navigation application may indicate certain planned events and/or destinations. A user of end device 180 may share this information with the MEC handover service.

Figure 2J:
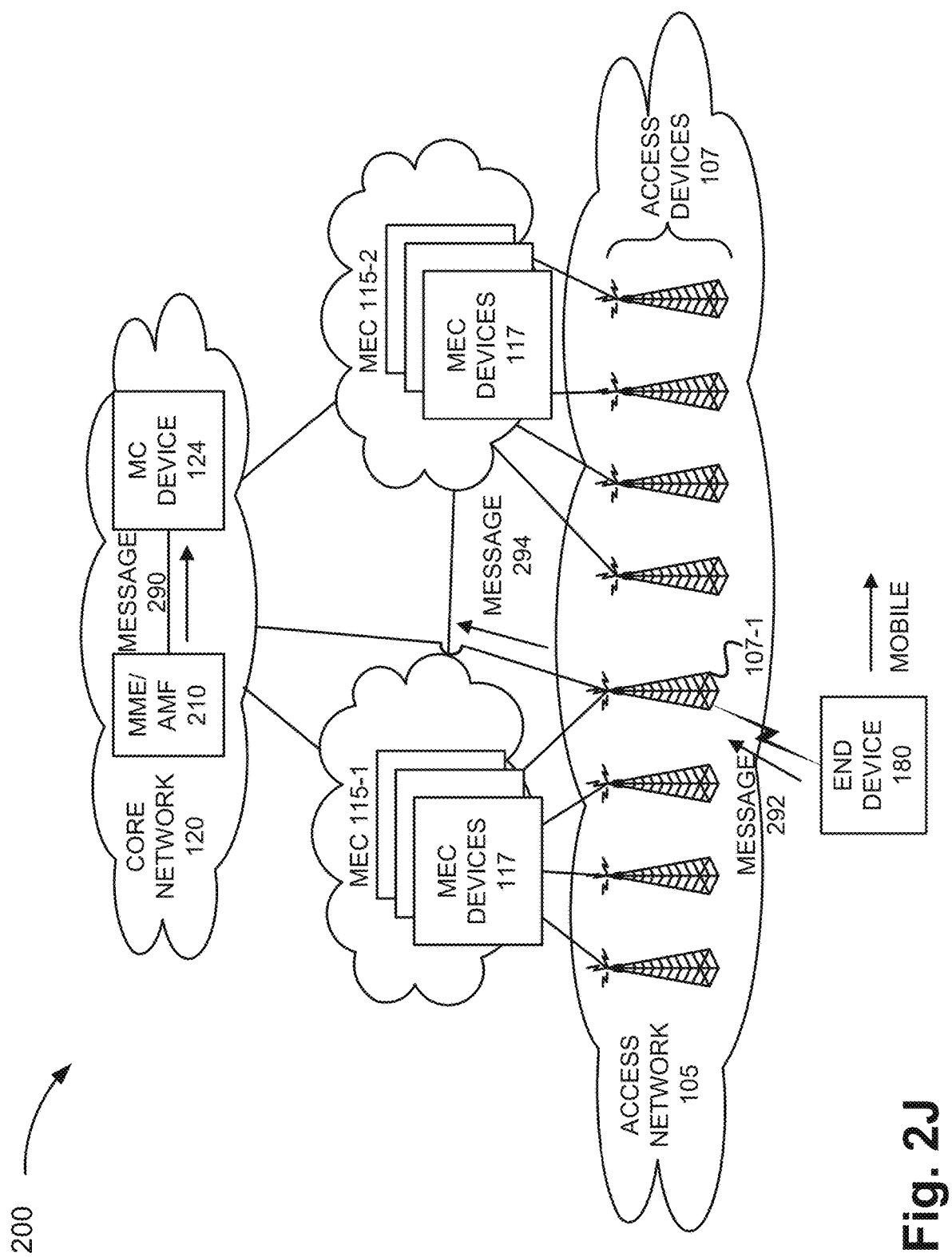

For purposes of illustration and description, FIG. 2J illustrates that a message 290, a message 292, and/or a message 294 may be communicated to migration controller 124 from various sources (e.g., end device 180, access device 107, MME/AMF 210). Although not illustrated, migration controller 124 may obtain mobility information from network device 127.

Although FIGS. 2A-2J illustrate an exemplary process of the MEC handover service, according to other exemplary embodiments, the process may include additional, different, and/or fewer steps. For example, additional, fewer, and/or different instances of information may be obtained or exchanged during the MEC handover process.

FIG. 4 is a diagram illustrating exemplary components of a device 400 that may be included in one or more of the devices described herein. For example, device 400 may correspond to components included in access device 107 of access network 105, MEC device 117 of MEC network 115, core device 122 and migration controller 124 of core network 120, network device 127 of external network 125, end device 180, and other network devices described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to migration controller 124, software 420 may include an application that, when executed by processor 410, provides a function of the MEC handover service, as described herein. Additionally, with reference to end device 180 and other network devices described, software 420 may include an application that, when executed by processor 410, provides a function of the MEC handover service, as described herein. Software 420 may also include firmware, middleware, microcode, hardware description language (HDL), and/or other form of instruction. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
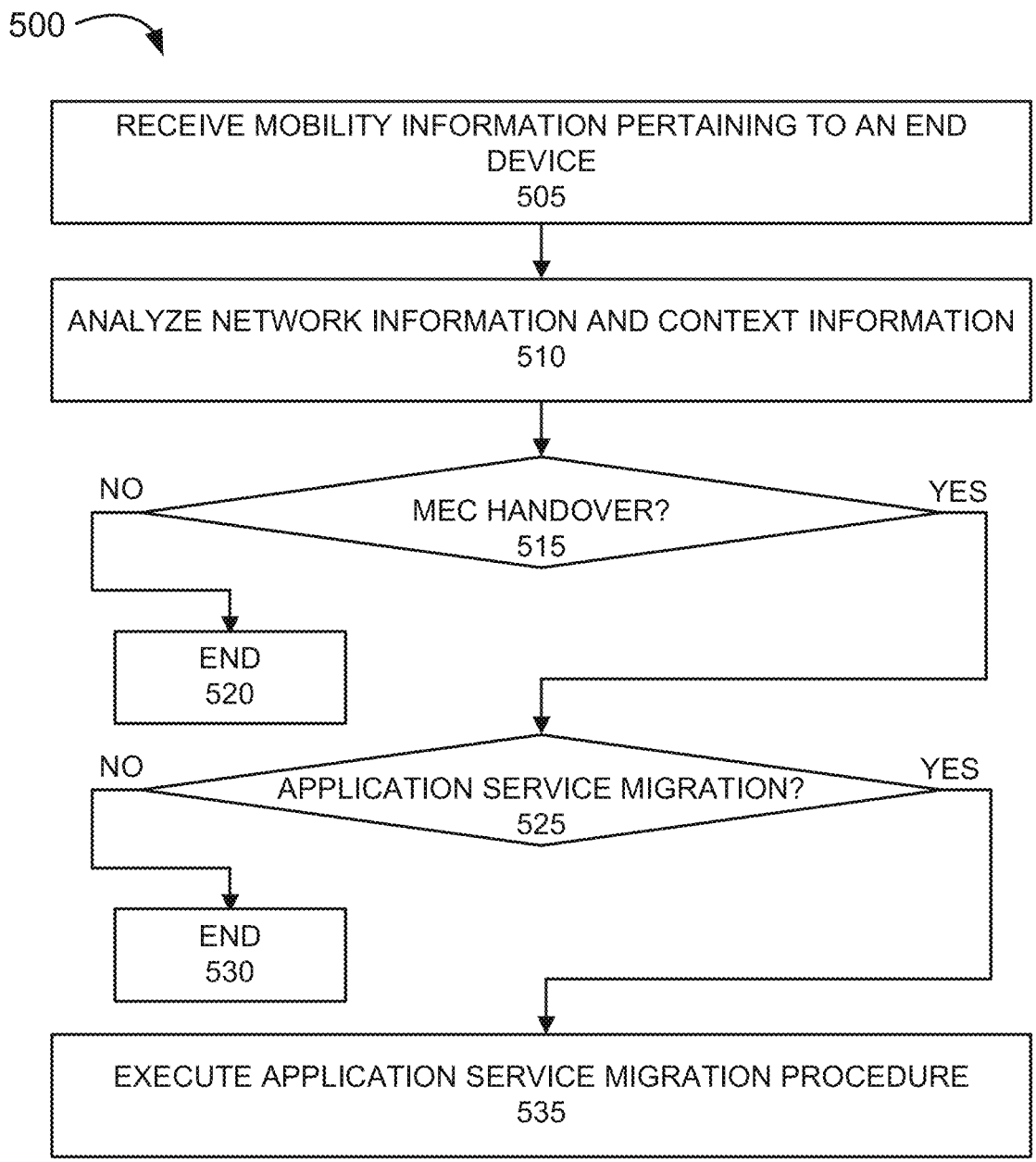
FIG. 5 is a flow diagram illustrating an exemplary process of an exemplary embodiment of the MEC handover service.

FIG. 5 is a flow diagram illustrating an exemplary process 500 of an exemplary embodiment of the MEC handover service. According to an exemplary embodiment, migration controller 124 that provides the MEC handover service as described herein, may performs steps of process 500. For example, processor 410 executes software 420 to perform a step illustrated in FIG. 5, and described herein. Alternatively, a step illustrated in FIG. 5, and described herein, may be performed by execution of only hardware.

Referring to FIG. 5, in block 505, for example, mobility information pertaining to an end device may be received. For example, migration controller 124 may receive a cell measurement report stemming from a cell reselection procedure. The cell measurement report may indicate a target cell/access device 107 to which end device 180 may be subject to in a handover. Additionally, or alternatively, for example, the mobility information may include geographic coordinate information, tracking area update information, a physical cell identifier, historical information, and/or projected route information associated with an end device application (e.g., calendar, etc.), as previously described.

In block 510, network information and context information may be analyzed. For example, in response to receiving the cell measurement report, migration controller 124 may analyze the various instances of data included in the network information of table 300 and the context information of table 330, as previously described.

In block 515, it may be determined whether a MEC handover is to be performed. For example, based on a result of the analysis, migration controller 124 may determine whether the target cell/access device 107 is connected to the same MEC network as the current source cell/access device 107.

When it is determined that the MEC handover is not to be performed (block 515—NO), process 500 may end (block 520). When it is determined that the MEC handover is to be performed (block 515—YES), it is determined whether an application service migration is to be performed (block 525). For example, migration controller 124 may determine whether the application or service is provisioned at the target MEC network and whether content and/or context information is to be provisioned. For example, migration controller 124 may use attribute information pertaining to the application service and the application service information indicating the application services provisioned at the target MEC network, which are stored in network information of table 300.

When it is determined that application service migration is not to be performed (block 525—NO), process 500 may end (block 530). When it is determined that application service migration is to be performed (block 525—YES), an application service migration procedure may be executed (block 535). For example, migration controller 124 may perform the application service migration procedure, as described herein to provide for the provisioning of the application service, content, and/or context information.

Although FIG. 5 illustrates an exemplary process 500 of the MEC handover service, according to other embodiments, process 500 may include additional operations, fewer operations, and/or different operations than those illustrated in FIG. 5, and described herein. For example, migration controller 124 may update routing tables in various network devices so as to enable the routing of the application service (e.g., content, etc) to the target MEC network.

Figure 6:
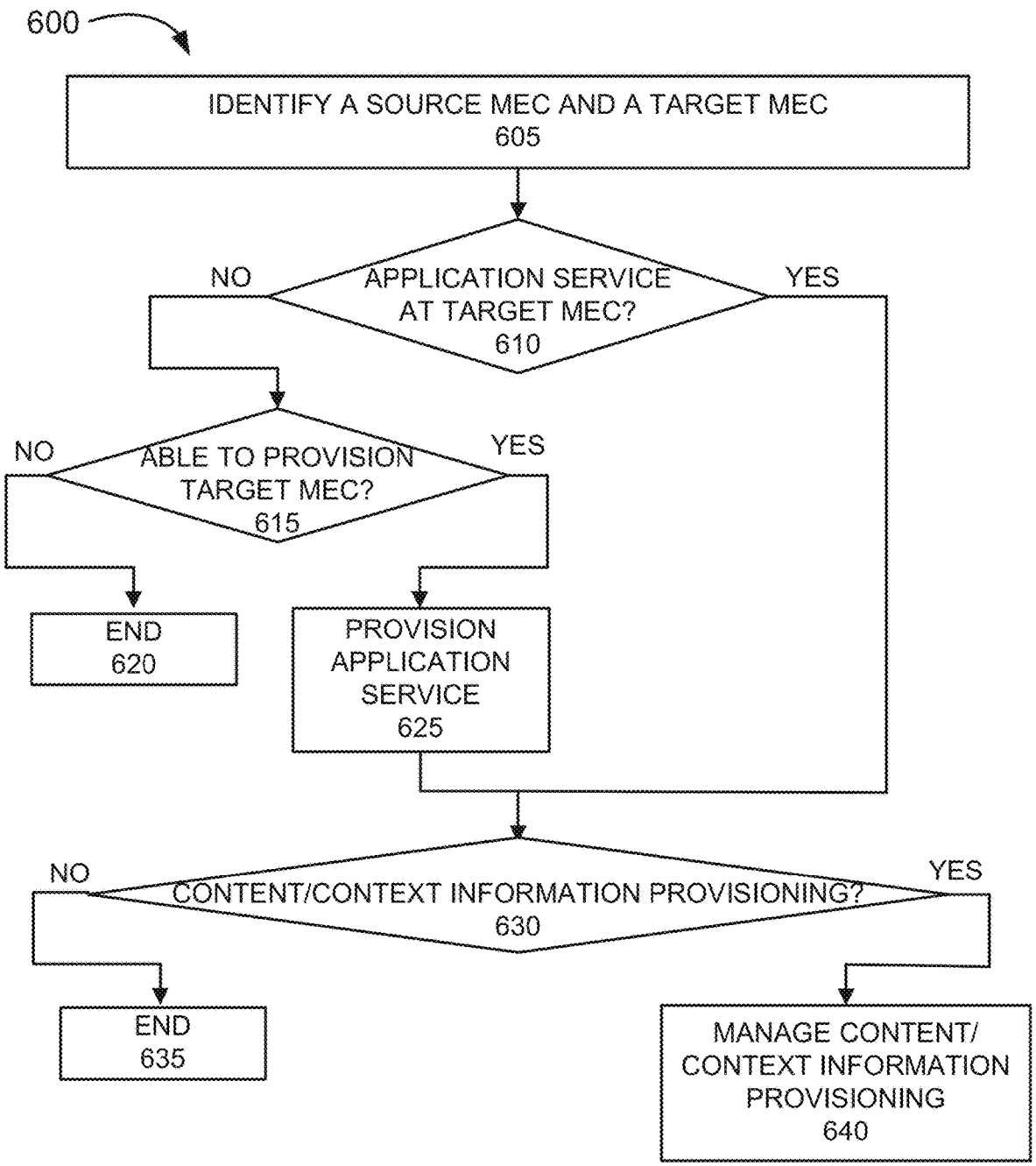
FIG. 6 is a flow diagram illustrating another exemplary process of an exemplary embodiment of the MEC handover service.

FIG. 6 is a flow diagram illustrating another exemplary process 600 of an exemplary embodiment of the MEC handover service. According to an exemplary embodiment, migration controller 124 that provides the MEC handover service as described herein, may performs steps of process 600. For example, processor 410 executes software 420 to perform a step illustrated in FIG. 6, and described herein. Alternatively, for example, a step illustrated in FIG. 6, and described herein, may be performed by execution of only hardware. According an exemplary embodiment, process 600 may be performed in response to determining that a MEC handover is to be performed.

In block 605, a source MEC and a target MEC may be identified. For example, migration controller 124 may identify a source MEC network 115 and a target MEC network 115 based on the network information and context information, as previously described.

In block 610, it may be determined whether the application service is provisioned at the target MEC. For example, migration controller 124 may identify the application service based on the context information (e.g., application service information associated with end device 180) and the network information (e.g., application services information associated with the target MEC network). Additionally, or alternatively, for example, migration controller 124 may use the external network information included in the context information.

When it is determined that the application service is not provisioned (block 610—NO), it may be determined whether the application service may be provisioned at the target MEC network (block 615). For example, migration controller 124 may analyze load and available network resource availabilities relating to the target MEC network, and determine whether the application service may be provisioned, as previously described. When it is determined that the application service may not be provisioned (block 615—NO), process 600 may end (block 620). For example, migration controller 124 may allow end device 180 to receive the application service from the source MEC network. When it is determined that the application service may be provisioned at the target MEC network (block 615—YES), migration controller 124 may invoke an application provisioning procedure to enable the provisioning of the application service at the target MEC network. For example, migration controller 124 may direct the target MEC network to provision the application service.

In block 630, it may be determined whether content and/or context information provisioning is to be performed. For example, in response to determining that the application service is provisioned (block 610—YES or block 625), migration controller 124 may analyze attribute information pertaining to the application service to determined whether content and/or context information is to be provisioned, as previously described.

When it is determined that content and/or context information is not to be provisioned (block 630—NO), process 600 may end (block 635). When it is determined that the content and/or context information is to be provisioned (block 630—YES), the provisioning of the content and/or context information may be managed (block 640). For example, migration controller 124 may communicate with the source MEC network and the target MEC network to facilitate a certain type of transfer for this information, as previously described.

Although FIG. 6 illustrates an exemplary process 600 of the MEC handover service, according to other embodiments, process 600 may include additional operations, fewer operations, and/or different operations than those illustrated in FIG. 6, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    receiving, by a network device, mobility information pertaining to an end device that is in a session of an application service with a source network;
    determining, by the network device, that a target network should be provisioned to provide the application service to the end device based on the mobility information and network information indicating application services currently provisioned at the target network;
    determining, by the network device, that at least one of content or context information pertaining to the session should be provisioned at the target network; and
    provisioning, by the network, the at least one of the content or the context information at the target network.

2. The method of claim 1, wherein the provisioning is performed before the end device establishes a connection with the target network.

3. The method of claim 1, wherein the mobility information indicates a target wireless access device of a wireless access network that the end device is subject to in a prospective handover.

4. The method of claim 1, wherein determining that at least one of content or context information pertaining to the session should be provisioned further comprises:
    analyzing, by the network device, attribute information pertaining to the application service; and
    determining, by the network device, that the least one of the content or the context information is used for providing the application service.

5. The method of claim 1, further comprising:
    identifying, by the network device, a target wireless access device based on the mobility information;
    identifying, by the network device, a source wireless access device based on the context information; and
    determining, by the network device based on the network information, whether the source wireless access device and the target wireless access device are mapped to the source network.

6. The method of claim 1, wherein the provisioning further comprises:
    transmitting, by the network device, a message to the source network and the target network indicating to copy the at least one of the content or the context information to the target network.

7. The method of claim 1, further comprising:
    receiving, by the network device prior to the receiving of the mobility information, a message from the target network, indicating application services provisioned at the target network; and
    storing, by the network device, the message with the network information.

8. The method of claim 1, further comprising:
    provisioning, by the network device when the target network is at least one of currently not provisioned or able to accept a prospective session with the end device, the target network to provide the application service to the end device.

9. A network device comprising:
    a processor configured to:
        receive mobility information pertaining to an end device that is in a session of an application service with a source network;
        determine that a target network should be provisioned to provide the application service to the end device based on the mobility information and network information indicating application services currently provisioned at the target network;
        determine that at least one of content or context information pertaining to the session should be provisioned at the target network; and
        provision the at least one of the content or the context information at the target network.

10. The network device of claim 9, wherein the provisioning is performed before the end device establishes a connection with the target network.

11. The network device of claim 9, wherein the mobility information indicates a target wireless access device of a wireless access network that the end device is subject to in a prospective handover.

12. The network device of claim 9, wherein, when determining that at least one of content or context information pertaining to the session should be provisioned, the processor is further configured to:
   analyze attribute information pertaining to the application service; and
   determine that the least one of the content or the context information is used for providing the application service.

13. The network device of claim 9, wherein the processor is further configured to:
   identify a target wireless access device based on the mobility information;
   identify a source wireless access device based on the context information; and
   determine, based on the network information, whether the source wireless access device and the target wireless access device are mapped to the source network.

14. The network device of claim 9, wherein, when provisioning, the processor is further configured to:
   transmit a message to the source network and the target network indicating to copy the at least one of the content or the context information to the target network.

15. The network device of claim 9, wherein the processor is further configured to:
   receive, prior to the receipt of the mobility information, a message from the target network, indicating application services provisioned at the target network; and
   store the message with the network information.

16. The network device of claim 9, wherein the processor further executes the instructions to:
   provision, when the target network is at least one of currently not provisioned or able to accept a prospective session with the end device, the target network to provide the application service to the end device.

17. A non-transitory computer-readable storage medium storing instructions executable by a processor of a device, which when executed cause the device to:
   receive mobility information pertaining to an end device that is in a session of an application service with a source network;
   determine that a target network should be provisioned to provide the application service to the end device based on the mobility information and network information indicating application services currently provisioned at the target network;
   determine that at least one of content or context information pertaining to the session should be provisioned at the target network; and
   provision the at least one of the content or the context information at the target network.

18. The non-transitory computer-readable storage medium of claim 17, wherein the provisioning is performed before the end device establishes a connection with the target network.

19. The non-transitory computer-readable storage medium of claim 17, wherein the instructions further comprise instructions, which when executed, cause the device to:
   provision, when the target network is at least one of currently not provisioned or able to accept a prospective session with the end device, the target network to provide the application service to the end device.

20. The non-transitory computer-readable storage medium of claim 17, wherein the instructions to determine that at least one of content or context information pertaining to the session should be provisioned, further comprise instructions to:
   analyze attribute information pertaining to the application service; and
   determine that the least one of the content or the context information is used for providing the application service.

* * * * *